May 14, 1968   G. B. DUNN, JR   3,383,530
DYNAMOELECTRIC MACHINE
Filed Nov. 9, 1965   2 Sheets-Sheet 1

INVENTOR.
GEORGE B. DUNN, JR.
BY *James C. Davis Jr.*
HIS ATTORNEY

May 14, 1968  G. B. DUNN, JR  3,383,530
DYNAMOELECTRIC MACHINE

Filed Nov. 9, 1965  2 Sheets-Sheet 2

INVENTOR.
GEORGE B. DUNN, JR.
BY *James C Davis Jr.*
HIS ATTORNEY 3,383,530
DYNAMOELECTRIC MACHINE
George B. Dunn, Jr., Fort Wayne, Ind., assignor to General Electric Company, a corporation of New York
Filed Nov. 9, 1965, Ser. No. 506,983
2 Claims. (Cl. 310—52)

ABSTRACT OF THE DISCLOSURE

A perforate end shield is provided at one end of a motor that is otherwise generally of the totally enclosed kind. A centrifugal fan is mounted outside the end shield on an extension of the rotor shaft, and an enclosing fan cover is provided which directs the main coolant flow over the external surface of the motor. The fan includes a circular plate having a set of centrifugal fan blades on either side thereof. One set of blades is adjacent the end surface of the end shield, and coolant outlet passages from the end turn cavity are provided in the end shield radially inwardly of the blades. Coolant inlet passages are provided in the outer peripheral portion of the end shield. The inlet passages are disposed axially inwardly of the plane of rotation of the blades and radially inward of the fan cover and the radial outer extremity of the blades.

---

Figure 1:
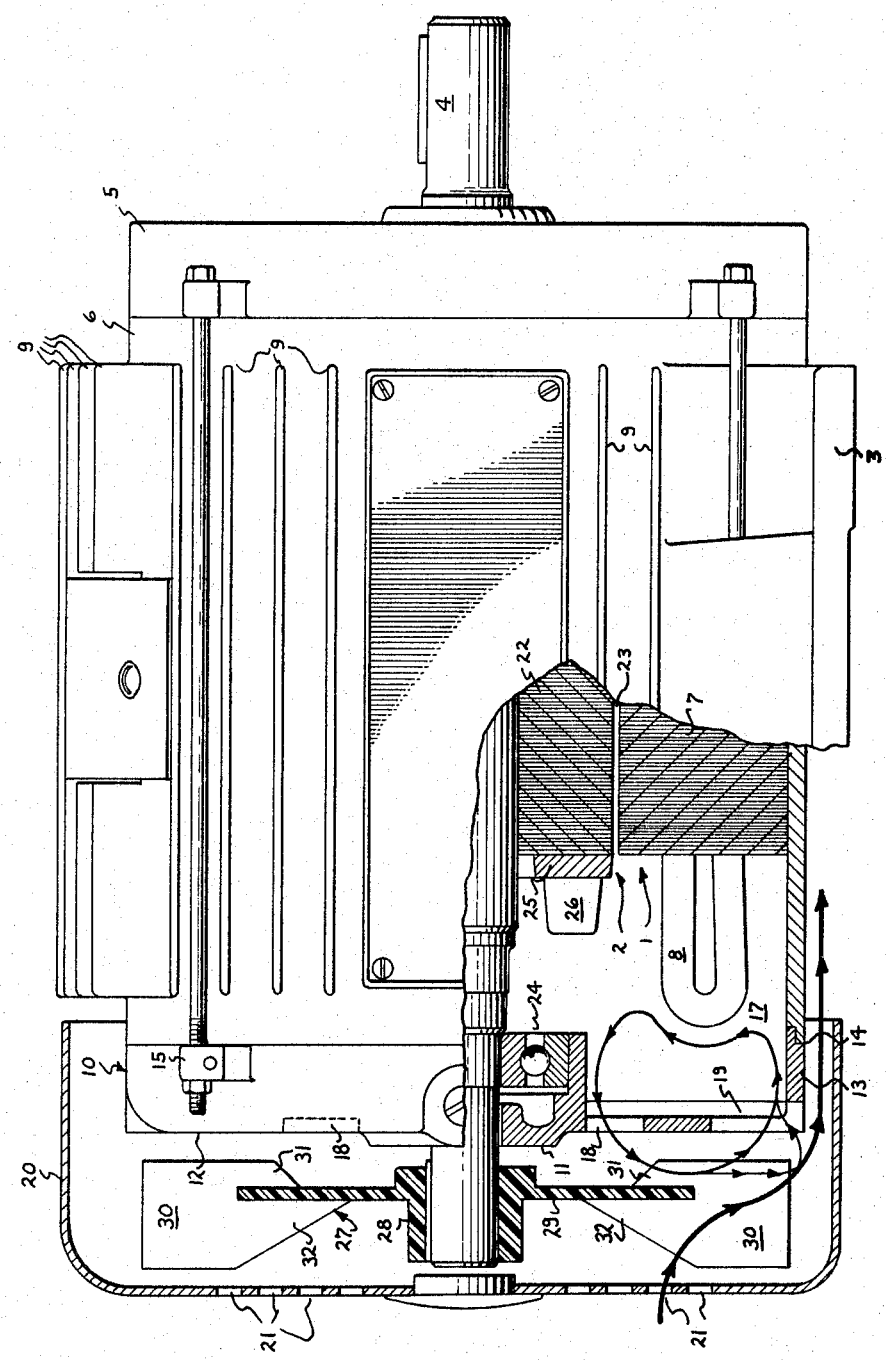

The present invention relates generally to dynamoelectric machines, as electric motors and generators, and more particularly pertains to means for dissipating to the atmosphere heat normally generated during operation of such machines. In the interest of a more clear and succinct description of the invention, the illustrative embodiment will be confined to the cooling system of an otherwise conventional electric motor.

One of the most common causes of premature failure in electric motors is traceable to overheating of the windings. Accordingly, a principal limitation on the magnitude of mechanical output power obtainable, or capacity, of a given electric motor is directly concerned with the temperature at which a balance, or equilibrium condition, is established between electrical losses in the form of heat generated within the motor on the one hand and the rate at which such heat is dissipated outside the motor on the other hand. In general, the maximum power obtainable from a given electric motor is increased whenever the rate of heat transfer from the motor is increased under an otherwise constant set of conditions. There are manifest advantages whenever an effective and compact cooling system can be provided that will permit a smaller size motor to perform a task formerly reserved for a larger size motor.

One of the most efficient cooling systems for electric motors from the standpoints of simplicity of construction and rate of heat dissipation is the open kind wherein an axial blower, or fan, is mounted on the rotor of the motor and forces cooling air taken in at one end of the motor through axially extending ducts in the stator and out the other end of the motor. Unfortunately, the environment, particularly in industrial applications, oftentimes contains hostile particles of grease, dust, grit, moisture, oil and the like which preclude use of the open kind of cooling systems.

The need for reliable motors in inhospitable environments has led to use of totally enclosed motors wherein heat is conducted to external cooling fins and no cooling air exchange occurs within the motor enclosure. There are many applications, however, for electric motors wherein conditions require more protection than afforded by the usual open motor construction and yet a totally enclosed motor, with its less efficient cooling system and greater size, is not mandatory. For example, a limited exchange of some external air would be permissible within the motor in the interest of greatly enhancing heat transfer to the surrounding environment or, perhaps, only one end of the motor need be totally enclosed, as the pulley, or drive, end thereof.

There is a heretofore unfulfilled need for an electric motor that could be denominated a hybrid and which approaches the totally enclosed motor in its ability to survive under adverse environmental conditions while at the same time retaining most of the high efficiency cooling characteristics of open motor constructions. Preferably the new kind of motor shares a maximum of common components with existing motor constructions and the cooling system thereof is relatively simple to promote long service life.

Accordingly, it is an object of my invention to provide a new kind of cooling system for dynamoelectric machines.

A more specific object of my invention is to provide a more effective dynamoelectric machine cooling system featuring protection from an inhospitable environment.

Another object of my invention is to provide a simple and improved dynamoelectric machine cooling system that is readily adaptable to present machine designs of the single phase kind.

Yet another object of my invention is to provide a dynamoelectric machine cooling system that approaches the effectiveness of the open kinds of cooling systems while sacrificing a minimum of the protective features afforded by totally enclosed cooling systems.

Briefly, in accord with a preferred embodiment of this invention, a perforate end shield is provided at one end of a motor that is otherwise generally of the totally enclosed kind. A centrifugal fan is mounted outside the end shield on an extension of the rotor shaft, and an enclosing fan cover is provided which directs the main coolant flow over the external surface of the motor. The fan includes a circular plate having a set of centrifugal fan blades on either side thereof. One set of blades is adjacent the end surface of the end shield, and coolant outlet passages from the end turn cavity are provided in the end shield radially inwardly of the blades. Coolant inlet passages are provided in the outer peripheral portion of the end shield. The inlet passages are disposed axially inward of the plane of rotation of the blades and radially inward of the fan cover and the radial outer extremity of the blades.

In operation, the fan blades suck coolant from the end turn cavity through the air outlet passages, and the coolant is replenished through the inlet passages after mixing with the external coolant flow. Harmful foreign particles are separated by centrifugal action of the blades and are not propelled into the end cavity because the inlet passages are not in the stream of main coolant flow.

Figure 2:
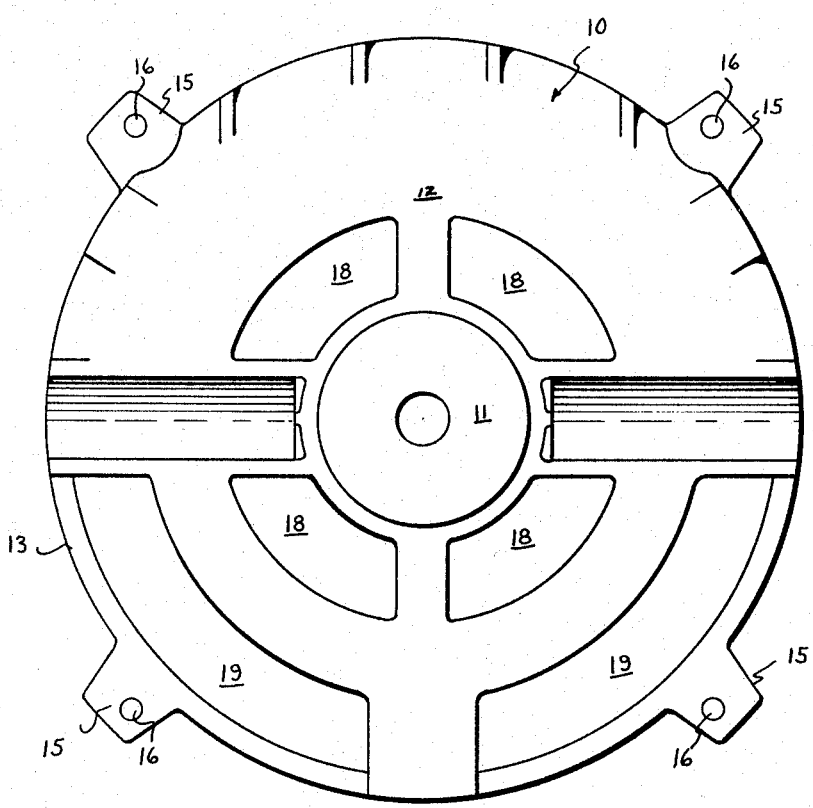

While the specification concludes with claims particularly pointing out and distinctly claiming the subject matter which I regard as my invention, it is believed the invention will be better understood from the following description taken in connection with the accompanying drawing wherein corresponding components are similarly designated and in which:

FIGURE 1 is a partly sectioned side view of a motor embodying the invention; and FIGURE 2 is a plan view of the motor end shield included in FIGURE 1.

The principal components of an electric motor of the kind illustrated in FIGURE 1 are the stator 1 and rotor 2. The stator commonly includes a base 3 that is rigidly secured to a platform, bench, or other fixed support. The rotor revolves relative to the stator in response to electrical energization of the stator, providing mechanical power available from any suitable transmission means driven by the rotor, typically an externally accessible rotating shaft 4 forming part of the rotor assembly. The end of the motor through which shaft 4 projects is known as the drive end and the other end of the motor is correspondingly called the opposite drive end. The drive end of the motor frequently is located near a source of contamination requiring a totally enclosed, or imperforate, end shield 5, whereas the opposite drive end of the same motor oftentimes need not be totally enclosed. It is in this setting that the present invention is most attractive although it will be apparent the invention is employed to advantage whenever total enclosure of either or both ends of a motor is not required.

In addition to imperforate end shield 5, stator 1 includes a frame 6, an annular stack 7 of laminations of ferromagnetic material supported by frame 6 and a winding in stack 7 having end turns 8 projecting axially therefrom. Frame 6 is preferably equipped with a plurality of external axially extending fins 9 spaced circumferentially about frame 6 to attain an increased surface for heat dissipation to the environment.

A perforate end shield 10 is provided at the opposite drive end of the motor, in accord with the invention, for the purpose of increasing the rate of heat dissipation from the motor. Referring additionally to FIGURE 2, end shield 10 includes a central hub 11 and a circular end wall 12 projecting radially outward from hub 11. End wall 12 is preferably susbtantially planar and perpendicular to the motor axis (which axis coincides with the longitudinal axis of shaft 4). End shield 10 also includes a cylindrical ring 13 forming the peripheral portion thereof. Ring 13 extends from end wall 12 to a circular rabbeted joint 14 with one end of frame 6. A plurality of lugs 15 extending radially outward from ring 13 and having convenient bolt-receiving holes 16 therein provide means adapted for fastening end shield 10 to frame 6, although other suitable securing means can be provided. Through-bolt construction is preferred wherein the end shields are drawn together, sandwiching the stator frame. End shield 10 completes a partly enclosed end turn cavity 17 for the motor.

A plurality of coolant outlet passages 18 from cavity 17 are provided through end wall 12 in the radially inner portion thereof and surrounding hub 11. Coolant inlet passages 19 are provided in the bottom half of end shield 10 near the outer periphery thereof. Optimum performance of the cooling system illustrated has been found to be obtained when passages 19 are defined by substantially equal cutaway surfaces of ring 13 and end wall 12. Thus, the axial and radial perspectives, or diagrammatic projections, of passages 19 are of approximately equal area. It is advantageous to provide passages 19 in the bottom half only of end shield 10 in order to prevent flooding or other contamination of end turn cavity 17 when the motor is inadvertently subjected to rainfall, or the like, particularly when standing idle.

The remaining component of the stator is a fan cover 20 that serves as a protective enclosure and as an air-directing baffle. Cover 20 resembles in shape half of an ordinary tin can. The circular end piece of cover 20 includes a plurality of coolant openings, as 21, formed through the radially inner portion thereof. Cover 20 is otherwise imperforate. The cylindrical portion of cover 20 is radially spaced from end shield 10 and extends axially inward therebeyond to provide an annular pressure chamber that causes some of the external coolant to enter end turn chamber 17 through inlet passages 19. Cover 20 is conveniently mounted to the remainder of the stator by means of radially extending bolts receivable in corresponding holes in lugs 15. In the illustrated embodiment, axial holes 16 in lugs 15 are offset for this purpose.

The rotor 2 comprises, in addition to the aforementioned shaft 4, a laminated rotor stack 22 of ferromagnetic material secured to shaft 4, as by a shrink or interference fit therewith. Rotor stack 22 is spaced radially inwardly from stator stack 7 by a relatively close running tolerance shown as the air gap 23. Shaft 4 is rotatably journaled in the end shields by suitable bearings, as bearing 24, for example, positioned in hub 11 of end shield 10. The particular rotor illustrated is of the well-known squirrel cage kind having axially extending conductors advantageously cast in slots therein and terminating in end rings 25 having coolant circulating projections 26 thereon. The windings, end rings 25 and projections 26 are conveniently cast into rotor stack 22 as an integral assembly of highly conductive material, as copper or aluminum, for example.

In order to provide forced primary coolant flow for the motor, a fan 27 is mounted for rotation with shaft 4 on an extension thereof projecting axially outward from end shield 10. Fan 27 is located in the space between end shield 10 and cover 20, and includes a hub 28, a generally circular fan plate 29 and a plurality of circumferentially spaced blades 30 projecting substantially perpendicularly from plate 29. The fan is advantageously cast, molded, or otherwise formed, as an integral assembly.

Fan blades 30 project axially from both sides of plate 29 to provide a set of inner blades 31 and a set of outer blades 32. Inner blades 31 are adjacent the outside end of end shield 10, whereas outer blades 32 project toward the end of cover 20. Inner blades 31 and outer blades 32 need not be equal in number nor do they necessarily lie in the same planes, as respectively illustrated, although a convenient structure that has been found strong and inexpensive to make is achieved by the illustrated configuration. Also, it is preferred that the blades 31 and 32 are perpendicularly disposed to the axis of rotation, as blades in a paddle wheel, so that high cooling efficiency is not dependent upon a particular direction of rotation.

In operation of the motor, fan 27 revolves rapidly relative to end shield 10 and cover 20. Outer fan blades 32 thereby become centrifugal impellers and establish a forced main coolant stream, or flow, in through coolant openings 21 and axially outward between cover 20 and frame 6 parallel to fins 9. In this way the motor receives the extent of cooling characteristic of totally enclosed fan cooled motors.

In accord with this invention, however, the motor is additionally cooled as an open kind of motor by causing circulation of some of the external coolant through end turn cavity 17. Toward this end, inner blades 31, disposed radially outward of outlet passages 18, withdraw coolant from cavity 17 through passages 18 and expel the coolant radially outward by centrifugal force. The withdrawn coolant is replenished by coolant flowing into inlet passages 19. Some of the cavity coolant recirculates in a churning annulus gently scrubbing end turns 8 and a proportion of the coolant is freshly received from the main coolant stream. The latter occurs because of the relatively high pressure region created in the vicinity of passage 19 by extending cover 20 axially substantially further inward than passage 19. Harmful airborne ingredients are forced toward the surface of cover 20 because they are heavier than the coolant and, accordingly, are centrifugally separated. Separation is further enhanced because the centrifugal fan blades extend radially outwardly at least as far as the radial extremity of passage 19. Separation is further achieved by gravity, particularly for the relatively heavy foreign particles, because passages 19 are disposed only in the bottom half of end shield 10.

The invention has been described in conjunction with an otherwise conventional motor that can be a common totally enclosed single phase induction motor having a squirrel cage rotor. In the preferred embodiment, the only change required in the motor illustrated is to replace one of the imperforate end shields with the perforate end shield of this invention which, in combination with the special fan cover and fan that can serve useful roles in either case, provides circulation of end turn cavity coolant outside the cavity and causes mixing therewith of a limited quantity of external coolant. While the cooling system described is equally applicable to polyphase machines, its use with single phase machines offers the unique advantage of in no way complicating or interfering with the centrifugal switch mechanisms oftentimes used in starting single phase machines, which switches are commonly mounted inside the opposite drive end shield.

The invention makes it possible to establish open cooling of one end cavity of a machine wherein the end cavities are isolated. By isolated, as used herein and in the appended claims, it is meant that there is no coolant passage between the end turn cavities within the motor as, for example, in the stator or rotor, or between the frame and stator. Provision of such passages reduces the space within which useful iron can be employed and thereby deleteriously affects the capacity of a given size machine as well as rendering the machine cooling system subject to clogging. Communication via the air gap is, of course, negligible insofar as exchange of coolant is concerned. Thus, the drive end of the motor illustrated is cooled as in the case of a totally enclosed motor, and additionally substantial heat transfer to the opposite drive end occurs through the electrical conductors, typically copper or aluminum, that also serve as excellent conductors of heat. It is apparent that either or both, of the drive and opposite drive ends, of a machine can be constructed as shown in conjunction with the latter herein.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

What I claim as new and desire to secure by Letters Patent of the United States is:

1. A dynamoelectric machine comprising:
   (a) a rotor and a stator, said rotor being journaled in said stator for rotation relative thereto;
   (b) two end shields on said stator enclosing respective isolated end turn cavities;
   (c) one of said end shields having a hub, a radially extending circular wall portion projecting from said hub and an axially inwardly extending cylindrical portion extending from the outer periphery of said circular wall portion;
   (d) coolant outlet passages through said circular wall portion adjacent said hub communicating with the end turn cavity corresponding to said one end shield;
   (e) coolant inlet passages through said one end shield at the junction of said circular wall portion and said cylindrical portion communicating with the end turn cavity corresponding to said one end shield;
   (f) said rotor including a shaft projecting through the hub of said one end shield;
   (g) a fan mounted on said shaft for rotation therewith axially outward of said one end shield, said fan including axially inner and axially outer centrifugal fan blades;
   (h) said axially inner fan blades being located adjacent the wall portion of said one end shield and extending radially from said coolant outlet passages to said coolant inlet passages; and
   (i) a fan cover spaced from said one end shield and enclosing said fan and a portion of said stator, said cover having coolant inlet openings in the end surface thereof, and said fan cover having an imperforate cylindrical portion thereof extending axially inward beyond said air inlet passages in the end shield to define the outer portion of a main coolant discharge path directed axially over the external surface of said machine, the other of said end shields being imperforate and disposed at the drive end of said machine.

2. The dynamoelectric machine of claim 1 wherein said inlet passages are disposed only in the bottom hemisphere of said one end shield.

References Cited

UNITED STATES PATENTS 2,286,750  6/1942  McMahan _____ 310—52
2,494,200  1/1950  Ramqvist _____ 310—52

MILTON O. HIRSHFIELD, *Primary Examiner.*

R. W. TEMPLETON, *Assistant Examiner.*